United States Patent
Jain (10) Patent No.: US 11,693,773 B2
(45) Date of Patent: Jul. 4, 2023

(54) SYSTEMS AND METHODS FOR IMPLEMENTING A FOUR-DIMENSIONAL SUPERBLOCK

(71) Applicant: Kioxia Corporation, Tokyo (JP)

(72) Inventor: Amit Jain, Cupertino, CA (US)

(73) Assignee: Kioxia Corporation, Tokyo (JP)

(*) Notice: Subject to any disclaimer, the term of this patent is extended or adjusted under 35 U.S.C. 154(b) by 176 days.

(21) Appl. No.: 16/354,582

(22) Filed: Mar. 15, 2019

(65) Prior Publication Data
US 2020/0293444 A1    Sep. 17, 2020

(51) Int. Cl.
*G06F 12/06* (2006.01)
*G06F 3/06* (2006.01)

(52) U.S. Cl.
CPC .......... *G06F 12/0692* (2013.01); *G06F 3/064* (2013.01); *G06F 3/0626* (2013.01); *G06F 3/0653* (2013.01); *G06F 3/0679* (2013.01)

(58) Field of Classification Search
CPC .... G06F 12/0692; G06F 3/0626; G06F 3/064; G06F 3/0653; G06F 3/0679
See application file for complete search history.

(56) References Cited

U.S. PATENT DOCUMENTS

| | | | |
|---|---|---|---|
| 8,572,311 B1* | 10/2013 | Shalvi | G06F 11/1016 711/103 |
| 2010/0228928 A1* | 9/2010 | Asnaashari | G06F 12/0246 711/170 |
| 2014/0215129 A1* | 7/2014 | Kuzmin | G06F 12/0246 711/103 |
| 2017/0177258 A1* | 6/2017 | Bates | G06F 3/0644 |
| 2019/0114106 A1* | 4/2019 | Elie | G06F 3/0604 |

FOREIGN PATENT DOCUMENTS

WO    WO-2019113821 A1 *    6/2019    ......... G06F 12/0246

* cited by examiner

*Primary Examiner* — Michelle T Bechtold
(74) *Attorney, Agent, or Firm* — Allen & Overy LLP (57) ABSTRACT

A solid state drive (SSD) is presented herein that includes a plurality of memory dies communicatively arranged in a plurality of communication channels such that each respective memory die is associated with a respective one communication channel of the plurality of communication channels, each respective memory die comprises one or more die regions, and each of the one or more die regions comprises a plurality of physical blocks configured to store data. The SSD further includes a memory controller communicatively coupled to the plurality of memory dies. The memory controller is configured to, upon a first power up of the SSD, determine a parameter of the SSD and for each of the one or more die regions, associate, based on the parameter, a number of physical blocks of the plurality of physical blocks with a block region of a plurality of block regions.

24 Claims, 7 Drawing Sheets

SYSTEMS AND METHODS FOR IMPLEMENTING A FOUR-DIMENSIONAL SUPERBLOCK

FIELD OF THE INVENTION

The present invention generally relates to systems and methods for assigning physical blocks to a superblocks upon first power up of a solid state drive (SSD).

BACKGROUND OF THE INVENTION

A solid state drive (SSD) typically comprises NAND flash memory made up of a plurality of memory dies and a memory controller. In certain configurations, superblocks will be associated with a plurality of storage blocks on the memory dies, such that devices may read data to and from superblocks. SSD firmware will partition the non-volatile memory dies based on the geometry of the drive, such as the number of communication channels, non-volatile memory dies, and planes. Typically, the geometry of the drive changes with varying drive sizes. In conventional systems, SSDs with varying storage sizes require firmware unique to the drive. Developing separate firmware for each geometry/requirement is costly, inefficient, and difficult to adapt with changing customer and market needs.

Accordingly, there is a long-felt need for an SSD system, which can accommodate various configurations of SSD firmware based on varying SSD geometries.

BRIEF DESCRIPTION OF THE INVENTION

In an aspect, a solid state drive includes a plurality of memory dies communicatively arranged in a plurality of communication channels such that each respective memory die is associated with a respective one communication channel of the plurality of communication channels, each respective memory die comprises one or more die regions, and each of the one or more die regions comprises a plurality of physical blocks configured to store data. The solid state drive also includes a memory controller communicatively coupled to the plurality of memory dies. The memory controller configured to, upon a first power up of the SSD, determine a parameter of the SSD and for each of the one or more die regions, associate, based on the parameter, a number of physical blocks of the plurality of physical blocks with a block region of a plurality of block regions.

In another aspect, a method for assigning physical blocks to a block region on a solid state drive includes, upon a first power up of the SSD, when the SSD includes a plurality of memory dies communicatively arranged in a plurality of communication channels such that each respective memory die is associated with a respective one communication channel of the plurality of communication channels, each respective memory die comprises one or more die regions, and each of the one or more die regions comprises a plurality of physical blocks configured to store data, determining a parameter of the SSD. And, for each of the one or more die regions, associating, based on the parameter, a number of physical blocks of the plurality of physical blocks with a block region of a plurality of block regions.

DETAILED DESCRIPTION OF THE INVENTION

Figure 1:
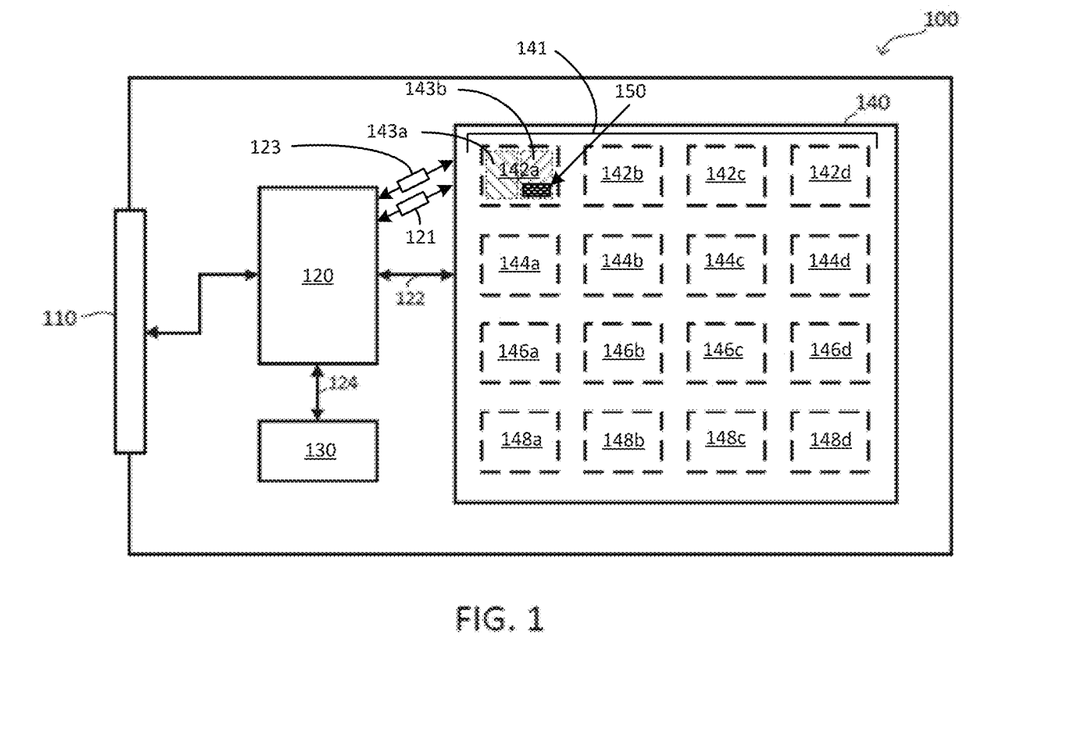
FIG. 1 is a block diagram of the structure of an SSD, according to one embodiment of the invention.

FIG. 1 is a block diagram of the structure of an SSD 100, according to one embodiment of the invention. As shown in FIG. 1, an SSD memory controller 120 is in communication with one or more host devices or host applications (not shown) through a host interface 110. The host device may comprise any suitable device, such as a computer or storage appliance. The SSD 100 includes both a volatile memory 130 and an array of non-volatile memory dies 140. The volatile memory device 130 and the array of non-volatile memory dies 140 are in communication 124 and 122, respectively, with the SSD memory controller 120. SSD 100 may be of any type of Stock Keeping Units (SKU) and may be made by any manufacturer that makes SSDs.

SSD 100 may comprise a number of non-volatile memory dies 140, such as NAND flash memory, that are arranged in groups (e.g., group 141) coupled to channels (e.g., communication channels 121 and 123) controlled by a channel controller (e.g., memory controller 120). For example, group 141 may comprise non-volatile memory dies 142a-142d. In some embodiments, group 141 may comprise any combination of non-volatile memory dies on SSD 100.

The array of non-volatile memory dies 140 comprises non-volatile memory dies 142a-d, 144a-d, 146a-d, and 148a-d that may be arranged in one or more channels in communication 122 with the SSD memory controller 120. While 16 non-volatile memory dies 142a-d, 144a-d, 146a-d, and 148a-d are shown in FIG. 1, the array of non-volatile memory dies 140 of the SSD 100 may comprise any suitable number of non-volatile memory dies 140 that are arranged in one or more channels in communication 122 with the SSD memory controller 120. In one embodiment, the volatile memory device 130 comprises a volatile memory DRAM buffer. The volatile memory device 130 need not be a single device of a unitary type, and may comprise multiple devices of different types capable of providing a volatile memory buffer for the SSD 100. In one embodiment, the non-volatile memory dies 142a-d, 144a-d, 146a-d, and 148a-d comprise NAND flash memory.

A die may further be organized into multiple "planes" (each die comprising two, four, or more planes), where each plane may process an I/O operation in parallel. For example, die 142a may comprise two planes, plane 143a and 143b, where each plane processes an I/O operation in parallel. A physical storage block from each of the non-volatile memory dies are commonly selected to create logical blocks or superblocks (e.g., superblock 150) for one or more host devices, such as a computer or storage appliance, to write and read data to and from, respectively. Selecting a physical block from each of the non-volatile memory dies to form superblocks allows parallel access to all of the non-volatile memory dies across all channels, achieving maximum bandwidth or throughput. For example, non-volatile memory die 142a may comprise superblock 150 on plane 143b. In some embodiments, non-volatile memory die 142a may comprise a plurality of superblocks. In some embodiments, superblock 150 may comprise physical blocks from a plurality of dies on SSD 100.

Figure 2:
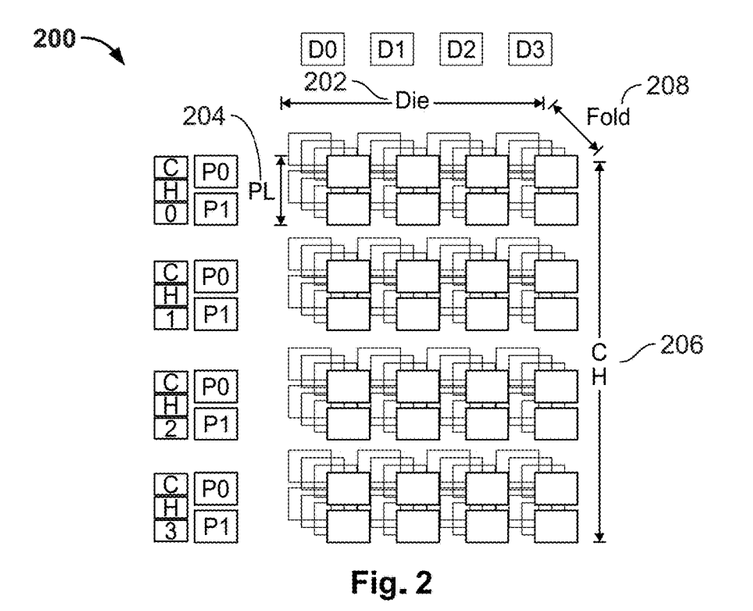
FIG. 2 is a block diagram of an SSD architecture corresponding to the superblock of FIG. 1, according to one embodiment of the invention.

FIG. 2 is a block diagram of an SSD architecture corresponding to superblock 200, according to one embodiment of the invention. As shown in FIG. 2, four non-volatile memory dies 202 (D0-D3) are arranged across four channels CH 206 (CH0-CH3). Each of the non-volatile memory die is further organized into two planes PL 204 (P0-P1), where each plane may process an I/O operation in parallel. Each plane of the SSD comprises a plurality of physical blocks.

Rather than superblocks being formed by selecting a physical block from each of the non-volatile memory dies across all 4 channels, the SSD architecture of FIG. 2 may assign physical blocks to a superblock based on a new parameter, herein referred to as "fold" 208. The fold parameter is a flexible parameter that is not limited by the SSD's hardware configurations (e.g., number dies, number of channels, and number of planes). The fold parameter indicates how many physical blocks should be allocated to a superblock from a single plane in the SSD. For example, in SSD architecture, the size of a superblock is a preset device property determined by the firmware of the SSD. For each SSD, the number of planes, the number of dies, and the number of channels are limited and predetermined by the SSD geometry. As different SSDs have different hardware geometries and firmware requirements, the introduction of the fold parameter gives flexibility in how physical blocks are allocated to superblocks to fulfill firmware requirements with geometry restraints. The value of the fold parameter may be the calculated from other parameters of the SSD (e.g., dimensions of the superblock retrieved from the device properties of the SSD). The size of the superblock is equal to the multiplicative result between the fold parameter and the number of dies, the number of planes, and the number of channels allocated to a superblock.

$$[\text{FOLD PARAMETER}] = \frac{[\text{SIZE OF THE SUPER BLOCK}]}{[\text{PLANES PER DIE}] * [\text{NUMBER OF DIE}] * [\text{NUMBER OF CHANNELS}]}$$

For example, in the SSD architecture of FIG. 2, the size of the superblock may be preset to be 128 physical blocks. The value of the fold parameter of the SSD architecture in FIG. 2 may be four $$\left(\text{e.g., } 4 = \frac{128 \text{ phyiscal blocks}}{2 \text{ planes} * 4 \text{ die} * 4 \text{ channels}}\right).$$

Therefore, four physical blocks from each plane on each die in the SSD architecture of FIG. 2 are allocated to a superblock, amounting to a total of 128 physical blocks being allocated to the superblock.

The fold parameter of the SSD is determined by an SSD controller upon first power up (e.g., the first time the SSD is booted up) of the SSD. Upon first power up, a memory controller of the SSD may retrieve the device properties (e.g., device parameters) stored on non-volatile memory (e.g., persistent memory) in the SSD. The SSD controller may retrieve the superblock dimensions (e.g., planes, dies, and channels) from the device properties and based on their values determine the fold parameter upon first power up. For example, the configuration of the SSD (e.g., whether it runs an input/output determinism (IOD) mode, streams, or non-customized firmware) may have superblock dimension requirements specific to the type of firmware. IOD is a feature of the NVMe storage protocol where the storage is split into separate regions called "sets", which are isolated regions to provide I/O accesses to a set with a guaranteed quality of service which is unaffected by I/O accesses to other sets. For example, an IOD set can provide predictable latency for I/O accesses to a storage device which is unaffected by other activity or I/O accesses to other sets of the storage device. Streams are a feature of storage devices to classify accesses to the storage device by host or application which is accessing the storage device, which is used when multiple hosts or applications simultaneously access the same storage device. This enables the storage device to place data according to the stream classification which may optimize the performance of the storage device by co-locating data of the same stream classification. For example, Streams firmware may require the superblock to span across all communication controllers for better performance. As another example, IOD firmware may require configuring superblocks using physical blocks from the same non-volatile memory dies in the same channel(s) to form isolation regions, such that operation collisions at the non-volatile memory dies and the channel controllers can be minimized or avoided altogether, allowing for lower latency, greater predictability, and more consistent I/O performance of the SSD.

The SSD controller can set the fold parameter based on the retrieved superblock dimensions (e.g., the allocated planes, dies, channels, and the superblock size). For example, the SSD controller may determine the fold parameter based on the equation presented above. After determining the fold parameter, the SSD controller may then construct a superblock mapping table and maintain the mapping table in persistent memory (e.g., non-volatile memory). For example, the SSD controller may create a four-dimensional superblock table, where the four dimensions correspond to the number of planes, the number of memory die, the number of channels, and the number of folds.

Figure 7:
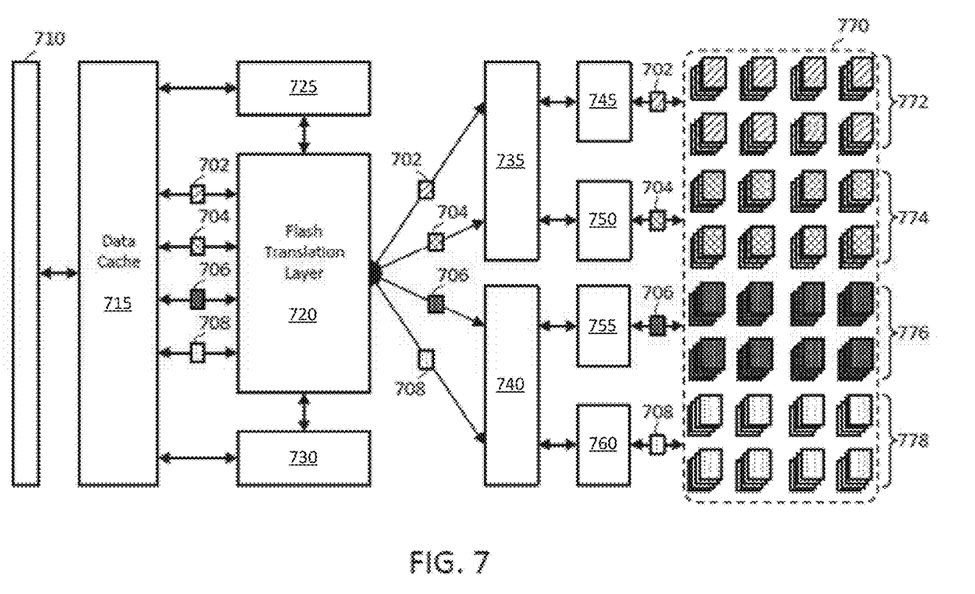
FIG. 7 is a block diagram of an SSD architecture, according to one embodiment of the invention.

A portion of the persistent memory (e.g., non-volatile memory) on the SSD may be allocated to store the superblock mapping table. The flash management layer (FML)

library, as described in FIG. 7, may manage access to the entries of each superblock in the mapping table. For example, each superblock, and each physical block in the plurality of physical blocks allocated to each superblock, may be accessed using the FML library. The entries may be access based on their unique dimensions (e.g., a physical block is indexed based on which plane, memory die, channel, and fold it resides on). As such, the fourth dimension, the fold parameter, may be treated as a logical parallel unit within the superblock, allowing the SSD controller to schedule erase, writes, and background operations on each fold independently. The usage of the FML library allows the corresponding firmware to be generic and unaffected by changing dimensions across various SSD configurations.

Figure 3:
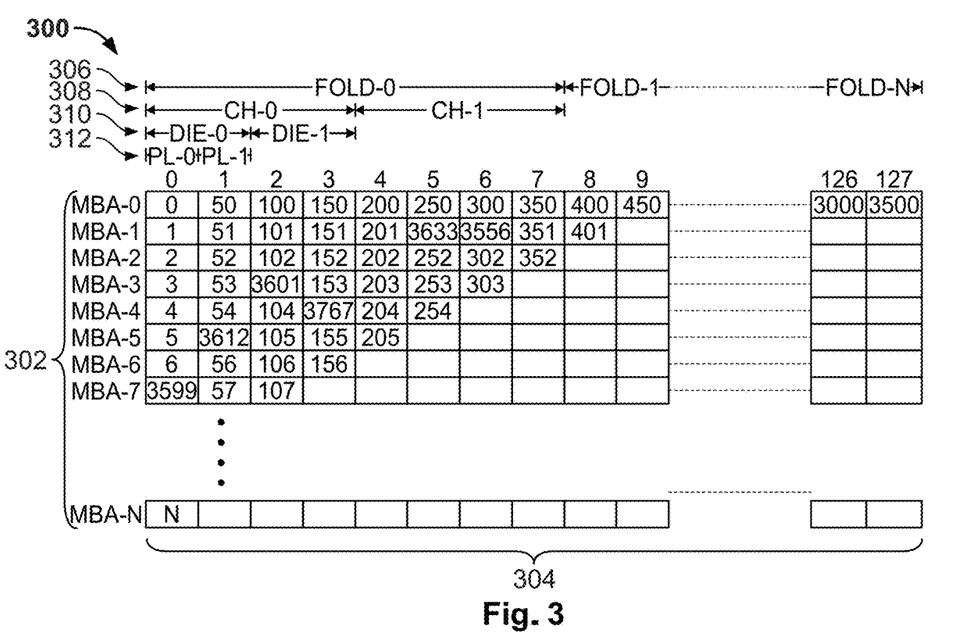
FIG. 3 is a block diagram of a block mapping table in a SSD, according to one embodiment of the invention.

FIG. 3 is a block diagram of a block mapping table in a SSD, according to one embodiment of the invention. Block mapping table 300 may be stored in non-volatile storage in the SSD, as described above. The SSD controller may create block mapping table 300 upon the initial power up of the SSD. The SSD controller creates and maintains block mapping table 300 by selecting a physical block within the boundaries of each dimension for each superblock, such that the fold parameter is satisfied, as described above. The each vertical column in block mapping table 300 corresponds to an individual plane in planes 312. Depending on the geometry of the SSD, one or more vertical columns may comprise one or more die 310 (DIE-0, DIE-1), one or more channels 308 (CH0, CH-1), and one or more folds 306 (FOLD-0, FOLD-1 . . . FOLD-N). The each row in the plurality of rows in block mapping table 300 correspond to a superblock in a plurality of superblocks 302 (MBA-0 . . . MBA-N).

For example, block mapping table 300 corresponds to a plurality of superblocks, each of which have a size of 128 physical blocks. As explained above, the size of each superblock is a preset parameter/property of the SSD, and can be equal to any amount of physical blocks. The first row (e.g., MBA-0) in block mapping table 300 corresponds to a single superblock. The superblock corresponding to the first row has an SSD geometry with 2 planes per die 2 die per channel, 2 channels, and N folds, where N is equal to 16 folds (e.g., 128 physical blocks/(2 planes*2 die*2 channels)), where 16 physical blocks are chosen from each plane to comprise the superblock. Block mapping table 300 maps each physical block to its corresponding superblock in the plurality of superblocks 302. The location of each physical block in the block mapping table 300 may be identified from its location in the table (e.g., based its corresponding die, plane, channel, and fold).

Figure 4A:
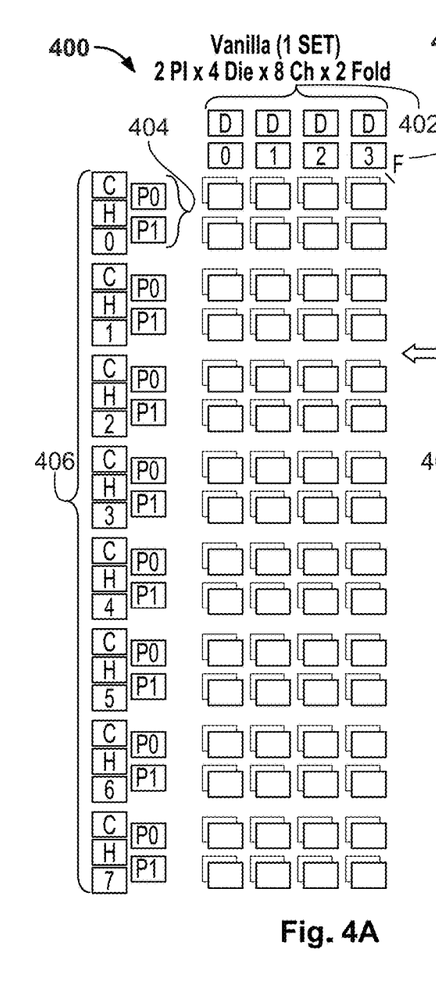
FIG. 4a is a block diagram of an SSD architecture using non-customized firmware, according to one embodiment of the invention.

FIG. 4a is a block diagram of an SSD architecture using non-customized firmware, according to one embodiment of the invention. FIG. 4a shows an SSD with die 402 (D0-D3), planes 404 (P0-P1), and channels 406 (CH0-CH7). FIG. 4a further has fold parameter 408, which varies depending on firmware requirements and superblock size requirements, as described above. FIG. 4a shows the SSD architecture with one superblock 400. For example, in FIG. 4a, the size of the superblock may be 128 physical blocks. As the SSD architecture corresponds to a single superblock (e.g., superblock 400), the fold parameter may be determined by the controller to be equal to two $$\left(\text{e.g., 2 folds} = \frac{128 \text{ physical blocks}}{2 \text{ planes} * 4 \text{ die} * 8 \text{ channels}}\right).$$

Therefore, the controller may assign two physical blocks from each plane to comprise the superblock.

Figure 4B:
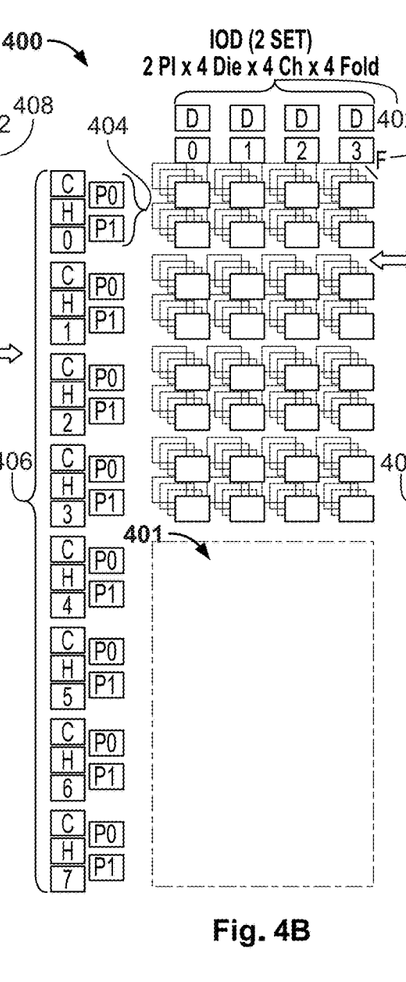
FIG. 4b is a block diagram of an SSD architecture using an I/O Determinism configuration, according to one embodiment of the invention.

FIG. 4b is a block diagram of an SSD architecture using an I/O Determinism configuration, according to one embodiment of the invention. The SSD architecture of FIG. 4b has the same geometry as the SSD architecture in FIG. 4a. FIG. 4b shows an SSD with die 402 (D0-D3), planes 404 (P0-P1), channels 406 (CH0-CH7), and fold 408. However, in FIG. 4b, the controller configures the superblocks using physical blocks from the same non-volatile memory dies in the same channel(s) to form isolation regions, such that I/O operation collisions at the non-volatile memory dies and the channel controllers can be minimized or avoided altogether, allowing for lower latency, greater predictability, and more consistent I/O performance of the SSD. In FIG. 4b, each superblock is constrained to a set amount of channels (e.g., a firmware requirement). For example, as shown in FIG. 4b, the SSD architecture comprises a superblock isolation region with two superblocks, superblock 400 and superblock 401. Therefore, superblock 400 is constrained to CH0-CH3 and superblock 401 is constrained to CH4-CH8. The controller may determine the fold parameter of the SSD architecture to equal 4

$$\left(\text{e.g., 4 folds} = \frac{128 \text{ physical blocks}}{2 \text{ planes} * 4 \text{ die} * 4 \text{ channels}}\right).$$

Therefore, the controller may assign four physical blocks from each plane to comprise the superblock.

Figure 4C:
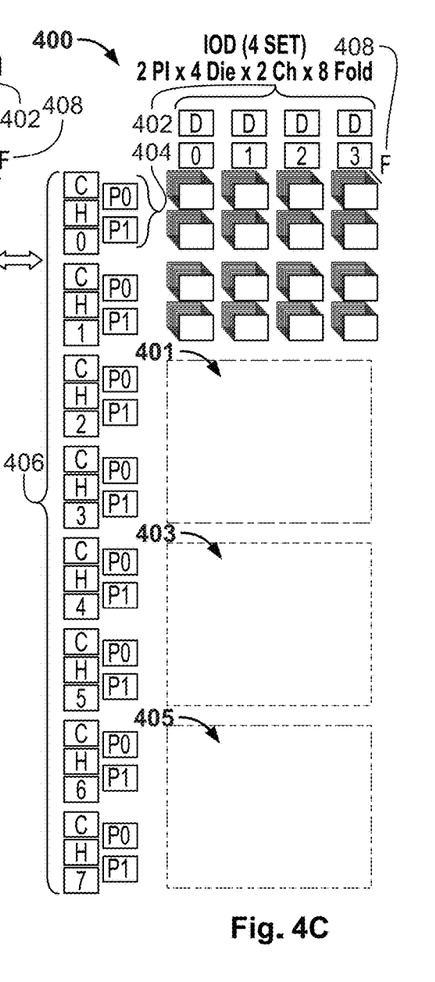
FIG. 4c is a block diagram of an SSD architecture using an I/O Determinism configuration, according to one embodiment of the invention.

FIG. 4c is a block diagram of an SSD architecture using an I/O Determinism configuration, according to one embodiment of the invention. The SSD architecture of FIG. 4c has the same geometry as the SSD architecture in FIGS. 4a and 4b. FIG. 4c shows an SSD with die 402 (D0-D3), planes 404 (P0-P1), channels 406 (CH0-CH7), and fold 408. However, in FIG. 4c, the controller configures the superblocks using physical blocks from the same non-volatile memory dies in the same channel(s) to form isolation regions, such that I/O operation collisions at the non-volatile memory dies and the channel controllers can be minimized or avoided altogether, allowing for lower latency, greater predictability, and more consistent I/O performance of the SSD. In FIG. 4c, each superblock is constrained to a set amount of channels (e.g., a firmware requirement). For example, as shown in FIG. 4a, the SSD architecture comprises a superblock isolation region containing four superblocks: superblock 400, superblock 401, superblock 403, and superblock 405. Therefore, superblock 400 is constrained to CH0-CH1, superblock 401 is constrained to CH2-CH3, superblock 403 is constrained to CH4-CH5, and superblock 401 is constrained to CH6-CH7. The controller may determine the fold parameter of the SSD architecture to equal 8

$$\left(\text{e.g., 8 folds} = \frac{128 \text{ physical blocks}}{2 \text{ planes} * 4 \text{ die} * 2 \text{ channels}}\right).$$

Therefore, the controller may assign eight physical blocks from each plane to comprise the superblock.

Figure 5A:
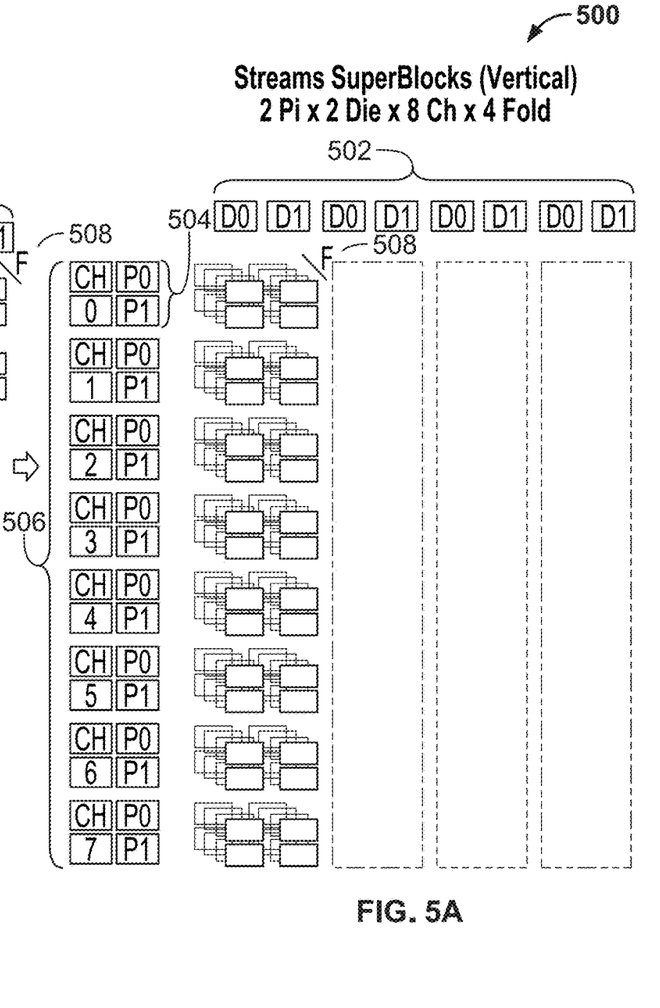
FIG. 5a is a block diagram of an SSD architecture using a Streams configuration, according to one embodiment of the invention.
Figure 5B:
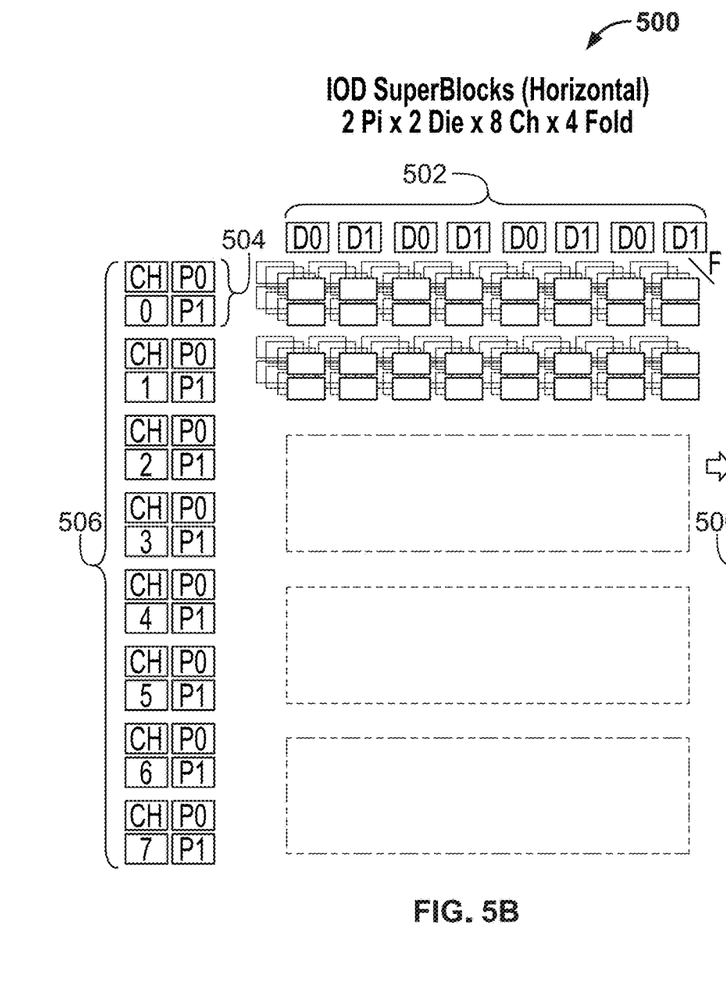
FIG. 5b is a block diagram of an SSD architecture using an I/O Determinism configuration, according to one embodiment of the invention.

FIG. 5a is a block diagram of an SSD architecture using a Streams configuration, according to one embodiment of the invention. In a multi-streamed SSD, the host system can explicitly open "streams" in the SSD and send write requests to different streams according to their expected lifetime. The multi-streamed SSD then ensures that the data in a stream are not only written together to a physically related NAND flash space (e.g., a NAND flash block or "erase unit"), but also separated from data in other streams. In a Streams configuration, superblocks are preferred to span across all channels for best performance, therefore the channel parameter value may be equivalent to the total amount of channels 506 in the SSD (e.g., CH0-CH7). FIG. 5a shows an SSD architecture with die 502 (D0-D7), planes 504 (P0-P1), channels 506 (CH0-CH7), and fold 508. For example, the SSD geometry of FIG. 5a can support a superblock isolation region with four superblocks in both a Streams configuration (e.g., a vertical superblock configuration, as shown in FIG. 5a) as well as a four superblocks in an I/O Determinism configuration (e.g., a horizontal superblock configuration, as shown in FIG. 5b) when the fold parameter is the same value (e.g., 4). The shape of the SSD geometry of FIG. 5a (e.g., whether it is in a Streams configuration, as shown in FIG. 5a or in a I/O Determinism configuration, as shown in FIG. 5b) is changed by modifying the number of channels and the number of dies associated with a superblock. Therefore, the controller of the SSD may change the configuration of the SSD (e.g., Streams vs. I/O Determinism) by changing the superblock dimensions in the block mapping table of FIG. 3 without having to change the firmware of the SSD.

FIG. 5b is a block diagram of an SSD architecture using an I/O Determinism configuration, according to one embodiment of the invention. IOD firmware may require configuring superblocks using physical blocks from the same non-volatile memory dies in the same channel(s) to form isolation regions, such that operation collisions at the non-volatile memory dies and the channel controllers can be minimized or avoided altogether, allowing for lower latency, greater predictability, and more consistent I/O performance of the SSD. FIG. 5b has the same geometry as FIG. 5a, and shows an SSD architecture with die 502 (D0-D7), planes 504 (P0-P1), channels 506 (CH0-CH7), and fold 508. For example an IOD requirement might require a superblock to span all memory dies of the SSD (e.g., a die parameter value equal to the total number of die on the SSD) when the fold parameter is the same value (e.g., 4).

Figure 6A:
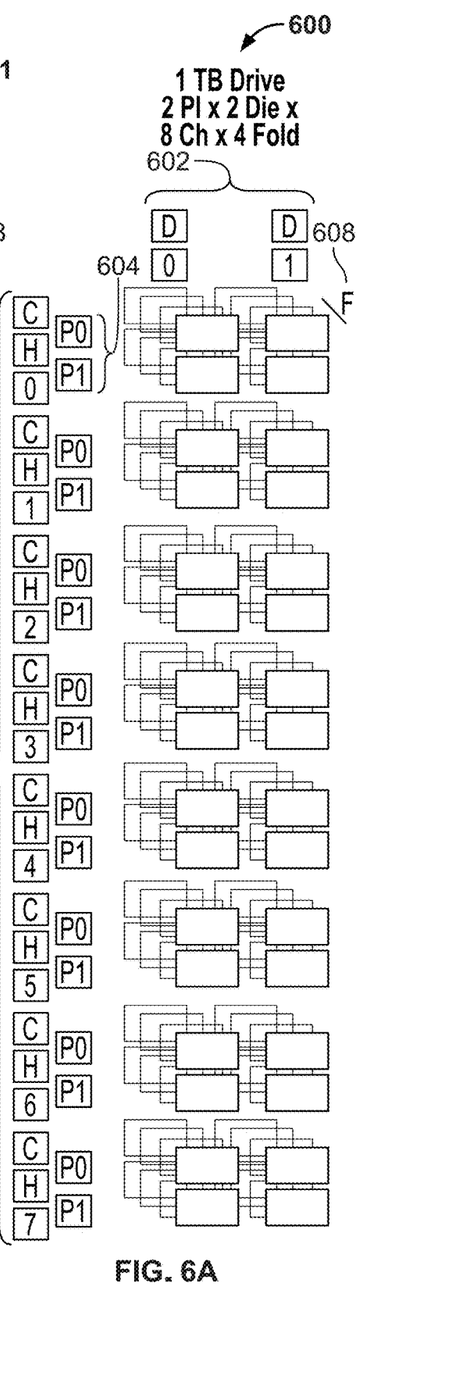
FIG. 6a is a block diagram of an SSD architecture corresponding to a 1 terabyte (TB) SSD, according to one embodiment of the invention.

FIG. 6a is a block diagram of an SSD architecture corresponding to a 1 terabyte (TB) SSD 600, according to one embodiment of the invention. FIG. 6a has an SSD geometry with die 602 (D0-D1), planes 604 (P0-P1), channels 606 (CH0-CH7), and fold 608.

Figure 6B:
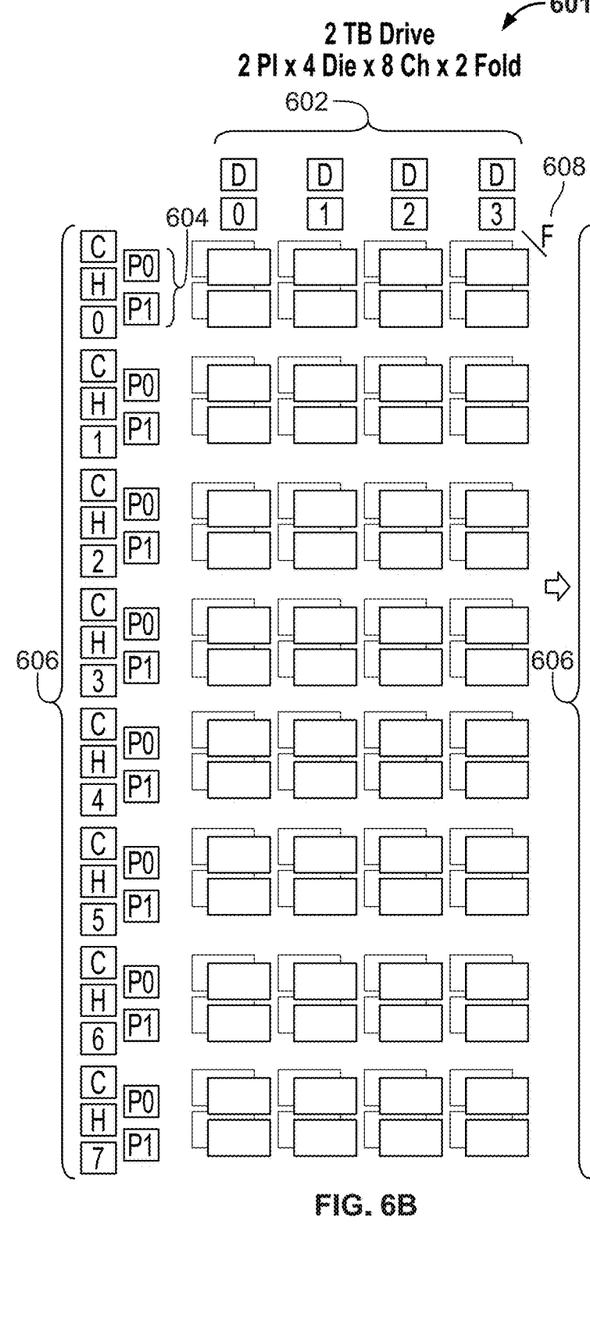
FIG. 6b is a block diagram of an SSD architecture corresponding to a 2 terabyte (TB) SSD, according to one embodiment of the invention.

FIG. 6b is a block diagram of an SSD architecture corresponding to a 2 terabyte (TB) SSD 601, according to one embodiment of the invention. FIG. 6b has an SSD geometry with die 603 (D0-D3), planes 604 (P0-P1), channels 606 (CH0-CH7), and fold 608. SSD 601 shown in FIG. 6b has twice as much storage as SSD 600 in FIG. 6a (e.g., twice as many memory die in SSD 601 than the memory die in SSD 600). The fold parameter allows for both SSD 600 and SSD 601 to construct superblocks with the same size. For example, the SSD 600, as shown in FIG. 6a, may have a fold parameter equal to 4 folds, while SSD 601, as shown in FIG. 6b, may have a fold parameter equal to 2 folds. Therefore, the fold parameter allows for SSDs with varying drive storage sizes to create superblocks of a same size without a need for custom firmware.

The addition of the fold parameter allows for the creation of superblocks based on the needs of a host device. For example, some host devices require highly configurable choices of memory dies for use by a host application, thus giving rise to the need to isolate superblocks by creating multiple shapes within same drive. While these solutions may require additional design constructs, the 4-dimensional superblock described above may be the base design as it offers flexibility to prepare the shape of the superblock after the SSD powers up.

FIG. 7 is a block diagram of the flow of data within an SSD architecture supporting low latency operation, according to one embodiment of the invention. The SSD architecture includes, but is not limited to, a host interface layer 710, a data cache 715, a flash management layer 725, a flash translation layer 720, a superblock mapping table 730, a flash interface layer 735, a flash interface layer 740, four dual-channel controllers 745, 750, 755, and 760, and a non-volatile memory array 770. Non-volatile memory array 770 includes an isolation region 772, an isolation region 774, an isolation region 776, and an isolation region 778. Each of isolation regions 772, 774, 776, and 778 comprises a superblock that includes all of the physical blocks on all of the non-volatile memory dies coupled to two channels. Superblock mapping table 730 stores the assignment of addresses of physical blocks in non-volatile memory array 770 to the logical superblocks and isolation regions. Dual channel controller 745 manages communications over the two channels of isolation region 772, dual channel controller 750 manages communications over the two channels of isolation region 774, dual channel controller 755 manages communications over the two channels of isolation region 776, and dual channel controller 760 manages communications over the two channels of isolation region 778. In other embodiments the non-volatile memory array can include other numbers of channels such as four or sixteen, and the SSD architecture can include single channel controllers, one for each channel of the non-volatile memory array.

The four isolation regions 772, 774, 776, and 778 of non-volatile memory array 770 allow the SSD to manage the exchange of data between one or more host devices or applications (not shown) and non-volatile memory array 770 as four independent "data pipes" such that data exchanges between a host application and one isolation region do not interfere with data exchanges between another host application and a different isolation region. Data cache 715, which is a set of memory locations in a volatile memory such as a DRAM of the SSD, caches commands and data for each isolation region independently. Flash translation layer 720 manages data 702 written to or read from isolation region 772, data 704 written to or read from isolation region 774, data 706 written to or read from isolation region 776, and data 708 written to or read from isolation region 778 independently from each other. For example, data 702 to be written to isolation region 772 is routed by flash translation layer 720 to flash interface layer 735 and dual channel controller 745. Similarly, data 706 read from isolation layer 776 is routed through dual channel controller 755 and flash interface layer 740, and flash translation layer 720 causes data 706 to be stored in the appropriate area of data cache 715.

Figure 8:
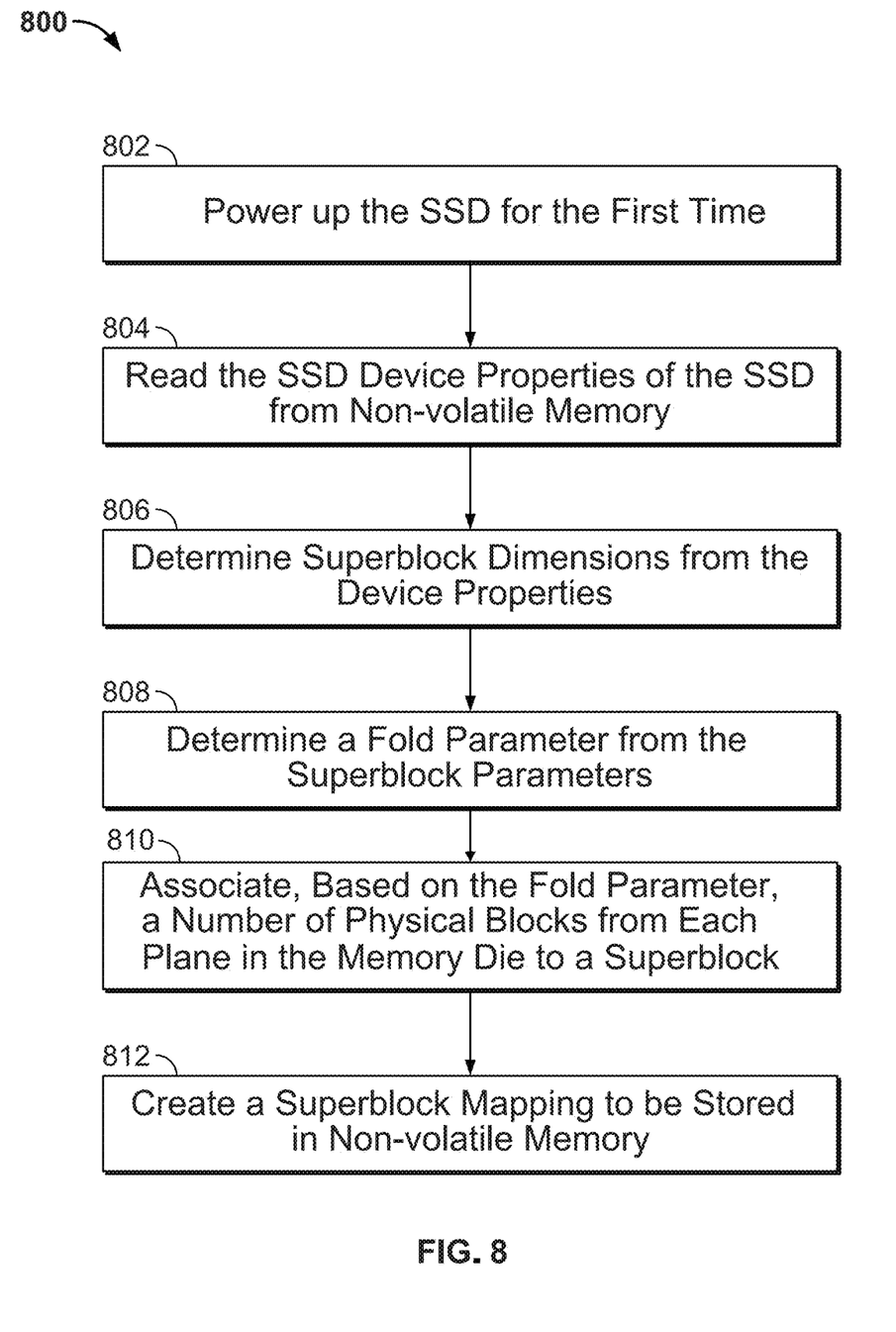
FIG. 8 shows a flow chart of a method for constructing a superblock mapping table and assigning physical blocks to a superblock, according to one embodiment of the invention.

FIG. 8 shows a flow chart of a method for constructing a superblock mapping table and assigning physical blocks to a superblock, according to one embodiment of the invention. At step 802, the SSD is booted up for the first time. For example, the SSD is powered on for the first time after the manufacturing of the SSD. At step 804, the memory controller of the SSD reads the device properties of the SSD from non-volatile memory. For example, the memory controller reads the device properties corresponding to the geometry of the SSD, the firmware requirements for each superblock, and any other relevant properties. At step 806, the memory controller determines the superblock dimensions (e.g., the number of planes, the number of memory dies, and the number of channels allocated for each superblock depending on the firmware configuration such as a generic drive, I/O Determinism, Stream configuration, number of I/O Determinism isolation regions, number of Streams, etc.). At step 808, the memory controller determines the fold parameter from the superblock dimensions. For example, the memory controller determines the fold parameter using the equation described above, where the fold parameter is determined from the superblock size and dimensions. At step 810, the memory controller associates, based on the fold parameter, a number of physical blocks from each plane in the memory die to a superblock. For example, if the fold parameter is equal to two folds, the memory controller may associate two physical blocks from each plane to a superblock.

At step 812, the memory controller creates a superblock mapping table that is stored in non-volatile memory in the SSD. For example the superblock mapping table may include information about each superblock in the plurality of superblocks on the SSD. Each superblock, and each physical block in the plurality of physical blocks allocated to each superblock, may be accessed using the FML library. The entries may be access based their unique dimensions (e.g., a physical block is indexed based on which plane, memory die, channel, and fold it resides on).

Other objects, advantages and embodiments of the various aspects of the present invention will be apparent to those who are skilled in the field of the invention and are within the scope of the description and the accompanying Figures. For example, but without limitation, structural or functional elements might be rearranged, or method steps reordered, consistent with the present invention. Similarly, principles according to the present invention could be applied to other examples, which, even if not specifically described here in detail, would nevertheless be within the scope of the present invention.

What is claimed is:

1. A solid state drive (SSD), comprising:
   a plurality of memory dies communicatively arranged in a plurality of communication channels such that each respective memory die is associated with a respective one communication channel of the plurality of communication channels, each respective memory die comprises one or more die regions, and each of the one or more die regions comprises a plurality of physical blocks configured to store data; and
   a memory controller communicatively coupled to the plurality of memory dies, the memory controller configured to, upon a first power up of the SSD:
   determine a parameter of the SSD; and
   for each die region of each memory die, associate, based on the parameter, a number of physical blocks of the plurality of physical blocks with a block region of a plurality of block regions,
   wherein a size of the block region is based on the parameter, a number of the one or more die region, a number of the plurality of memory dies, and a number of the plurality of communication channels.

2. The SSD of claim 1, further comprising a plurality of channel controllers communicatively coupled to the plurality of communication channels, respectively.

3. The SSD of claim 1, wherein the memory controller is further configured to, upon the first power up of the SSD:
   retrieve a plurality of parameters of the SSD, wherein the plurality of parameters of the SSD comprise:
   for each respective memory die, the number of the one or more die regions;
   the number of the plurality of memory dies;
   the number of the plurality of communication channels; and
   the size of the block region.

4. The SSD of claim 3, wherein the memory controller is further configured to, upon the first power up of the SSD:
   calculate the parameter from the plurality of parameters of the SSD, wherein the size of the block region corresponds to a multiplication product of the parameter, the number of the one or more die region, the number of the plurality of memory dies, and the number of the plurality of communication channels.

5. The SSD of claim 4, wherein the memory controller is further configured to, upon the first power up of the SSD:
   generate a mapping table for each block region of the plurality of block regions.

6. The SSD of claim 5, wherein the mapping table is indexed based on the plurality of parameters of the SSD.

7. The SSD of claim 5, wherein the memory controller is further configured to retrieve a location in memory of a physical block from the mapping table.

8. The SSD of claim 1, wherein the SSD is configured to be compatible with a plurality of types of the SSD, wherein each type in the plurality of types of the SSD corresponds to an Stock Keeping Unit of a plurality of Stock Keeping Units.

9. The SSD of claim 1, wherein the SSD is configured to be compatible with a plurality of Input Output Determinism configurations of the SSD.

10. The SSD of claim 1, wherein the SSD is configured to be compatible with a plurality of Input Output Determinism configurations of the SSD and a plurality of types of the SSD, wherein each type in the plurality of types of the SSD corresponds to an SKU of a plurality of SKUs.

11. The SSD of claim 1, wherein the SSD is configured to be compatible with an Input Output Determinism configuration of the SSD, a generic configuration of the SSD, and a Streams configuration of the SSD.

12. The SSD of claim 1, wherein the SSD is of a first SKU and wherein a parameter of a first block of the one or more block regions and a parameter of a second block of the one or more block regions are different.

13. A method for assigning physical blocks to a block region on a solid state drive (SSD), the method comprising:
    upon a first power up of the SSD, wherein the SSD comprises a plurality of memory dies communicatively arranged in a plurality of communication channels such that each respective memory die is associated with a respective one communication channel of the plurality of communication channels, each respective memory die comprises one or more die regions, and each of the one or more die regions comprises a plurality of physical blocks configured to store data,
    determining a parameter of the SSD; and
    for each die region of each memory die, associating, based on the parameter, a number of physical blocks of the plurality of physical blocks with a block region of a plurality of block regions,
    wherein a size of the block region is based on the parameter, a number of the one or more die region, a number of the plurality of memory dies, and a number of the plurality of communication channels.

14. The method of claim 13, wherein the SSD further comprises a plurality of channel controllers communicatively coupled to the plurality of communication channels, respectively.

15. The method of claim 13 further comprising, upon the first power up of the SSD:

retrieving a plurality of parameters of the SSD, wherein the plurality of parameters comprise:
for each respective memory die, the number of the one or more die regions;
the number of the plurality of memory dies;
the number of the plurality of communication channels; and
the size of the block region.

16. The method of claim 15, further comprising, upon the first power up of the SSD:
calculating the parameter from the plurality of parameters of the SSD, wherein the size of the block region corresponds to a multiplication product of the parameter, the number of the one or more die region, the number of the plurality of memory dies, and the number of the plurality of communication channels.

17. The method of claim 16, further comprising, upon the first power up of the SSD:
generating a mapping table for each block region of the plurality of block regions.

18. The method of claim 17, further comprising: indexing the mapping table based on the plurality of parameters of the SSD.

19. The method of claim 17, further comprising:
retrieving a location in memory of a physical block from the mapping table.

20. The method of claim 13, further comprising:
configuring the SSD to be compatible with a plurality of types of the SSD, wherein each type in the plurality of types of the SSD corresponds to an SKU of a plurality of SKUs.

21. The method of claim 13, further comprising:
configuring the SSD to be compatible with a plurality of Input Output Determinism configurations of the SSD.

22. The method of claim 13, further comprising:
configuring the SSD compatible with a plurality of Input Output Determinism configurations of the SSD and a plurality of types of the SSD, wherein each type in the plurality of types of the SSD corresponds to an SKU of a plurality of SKUs.

23. The method of claim 13, further comprising:
configuring the SSD to be compatible with an Input Output Determinism configuration of the SSD, a generic configuration of the SSD, and a Streams configuration of the SSD.

24. The method of claim 13, wherein the SSD is of a first SKU and wherein a parameter of a first block of the one or more block regions and a parameter of a second block of the one or more block regions are different.

* * * * *